United States Patent
Ekvetchavit et al.

(10) Patent No.: US 6,748,011 B2
(45) Date of Patent: Jun. 8, 2004

(54) EFFICIENT MULTICARRIER FILTER

(75) Inventors: Thunyachate Ekvetchavit, San Diego, CA (US); Maruthy Vedam, San Diego, CA (US); Inyup Kang, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 296 days.

(21) Appl. No.: 09/756,843

(22) Filed: Jan. 9, 2001

(65) Prior Publication Data

US 2002/0159551 A1 Oct. 31, 2002

(51) Int. Cl.[7] .............................. H04B 1/707; H04B 1/10
(52) U.S. Cl. ........................................ 375/148; 375/350
(58) Field of Search ................................ 375/141, 143, 375/144, 148, 147, 152, 232, 235, 350, 260

(56) References Cited

U.S. PATENT DOCUMENTS 4,796,188 A  *  1/1989  Gale et al. ................ 701/200
5,828,710 A  * 10/1998  Beale ........................ 375/344
6,442,155 B1 *  8/2002  Suk et al. .................. 370/342
6,452,987 B1 *  9/2002  Larsson et al. ............ 375/345

* cited by examiner

Primary Examiner—Don N. Vo
(74) Attorney, Agent, or Firm—Philip R. Wadsworth; Charles D. Brown; Nicholas J. Pauley

(57) ABSTRACT

A multi-carrier filter for a wireless communications system employing a multi-carrier signal. The multi-carrier filter includes a first mechanism for receiving the multi-carrier signal and extracting carrier signal components of the multi-carrier signal in response thereto. A second mechanism filters the carrier signal components and outputs a demodulated and filtered multi-bandwidth signal in response thereto. In the specific embodiment, the first mechanism includes a rotator. The multi-carrier signal is a 3× bandwidth multi-carrier signal having three carrier components. The three carrier components include a center carrier, a left carrier, and a right carrier. The center carrier, the left carrier, and the right carrier are separated by approximately 1.25 MHz. The rotator is a lookup table rotator that includes a mechanism for selectively rotating the multi-carrier-signal clockwise or counter clockwise and outputting the left carrier or the right carrier, respectively, in response thereto.

21 Claims, 6 Drawing Sheets

EFFICIENT MULTICARRIER FILTER

BACKGROUND OF THE INVENTION

1. Field of Invention

This invention relates to telecommunications systems and related hardware. Specifically, the present invention relates to filters for Code Division Multiple Access (CDMA) wireless communications systems employing a plurality of carrier signals.

2. Description of the Related Art

Wireless communications systems are employed in a variety of demanding applications including urban mobile telephone and business applications. Such applications require reliable communications systems that can efficiently accommodate increased demand while minimizing dropped calls.

A wireless communications system, such as a Code Division Multiple Access system (CDMA), typically includes a plurality of mobile stations (e.g. cellular telephones or wireless phones) in communication with one or more base stations or Base Station Transceiver Subsystems (BTS), also called cell sites. The communications link from a BTS to a mobile station is known as the forward link. The communications link from the mobile station to the BTS is known as the reverse link.

A base station or BTS facilitates call routing among mobile stations and between mobile stations and other communications devices that are connected to the Public Switched Telephone Network (PSTN), also called the landline network.

CDMA communications systems are often built in accordance with the IS-95 telecommunications industry standard. In IS-95 systems, data is transmitted between a BTS and a mobile station in 20 millisecond frames. The frames are encoded digitally for channel noise, capacity, and data security reasons. A convolutional encoder often facilitates the encoding of the information within each frame.

To increase the reliability and capacity of CDMA communications systems, newer CDMA systems, called 3×CDMA systems are employed. 3× CDMA systems are either 3×Direct-Spread (3×DS) or 3×Multi-Carrier (3×MC) systems. A 3×DS system is similar to an IS-95 system but transmits at three times the IS-95 chip rate (3×1.2288 Mchips/s). A 3×MC signal is a 3× bandwidth signal having three carrier signals with center frequencies spaced 1.25 MHz apart. The 3×MC signal includes left, center, and right carriers.

Before transmission in a 3×CDMA system (CDMA2000 system), communications signals are encoded, interleaved, scrambled, and multiplexed onto three data streams. Each data stream is transmitted via one of three different carrier signals (carriers) yielding a 3× bandwidth signal. In a wireless phone, the 3× bandwidth signal is downconverted to baseband, filtered, and then sent to an associated Mobile Station Modem (MSM). To demodulate the received 3×MC signal, the MSM requires that the 3×MC filter be lowpass filtered. The lowpass filter must maximize the Signal-to-Noise Ratio (SNR) by extracting each carrier signal from the received 3× bandwidth signal with small inter-carrier interference and by closely matching base station pulse shaping effects. The filter should also accommodate the effects of base station pre-equalization on the received signal. Unfortunately, before the present invention, a lowpass filter that sufficiently performs these functions was not available.

Existing low-pass filters neither effectively compensate for base station pre-equalization filtering, nor extract each carrier signal from the 3× bandwidth filter, nor closely match the base station's pulse shaping. Consequently, existing filters may result in undesirably large inter-carrier interference and may fail to minimize overall phase nonlinearly of the received signal, which degrades signal quality.

Hence, a need exists in the art for an efficient filter for demodulating a received 3× bandwidth CDMA signal that minimizes inter-carrier interference, compensates for base station pre-equalization filtering, and that closely matches the base station's pulse shaping.

SUMMARY OF THE INVENTION

The need in the art is addressed by the multi-carrier filter for a wireless communications system employing a multi-carrier signal of the present invention. In the illustrative embodiment, the inventive filter is adapted for use with a multi-carrier wireless CDMA system and includes a first mechanism for receiving the multi-carrier signal and extracting constituent carrier signal components in response thereto. A second mechanism filters the carrier signal components and outputs a demodulated and filtered multi-bandwidth signal in response thereto.

In a more specific embodiment, the first mechanism includes a rotator. The multi-carrier signal is a 3× bandwidth multi-carrier signal having three carrier components. The three carrier components include a center carrier, a left carrier, and a right carrier. The center carrier, the left carrier, and the right carrier are separated by approximately 1.25 MHz. The rotator is a lookup table rotator that includes a mechanism for selectively rotating the multi-carrier-signal clockwise or counter clockwise and outputting the left carrier or the right carrier, respectively, in response thereto.

In the illustrative embodiment, the second mechanism includes an Infinite Impulse Response (IIR) filter for matching base station pulse shaping associated with the multi-carrier signal. The second mechanism further includes a mechanism for compensating for pre-equalization effects on the multi-carrier signal to minimize phase non-linearity. The IIR filter is a $5^{th}$ order elliptic IIR filter, which is employed as a 1× lowpass filter for lowpass filtering the individual carrier signal components. The carrier signal components include three data streams separated in frequency.

The IIR filter has a cascade direct form II filter structure and is characterized by the following transfer function:

$$H(z) = \alpha_{00} \frac{(\beta_{00} + \beta_{01}z^{-1} + \beta_{02}z^{-2})}{(1 + \alpha_{01}z^{-1} + \alpha_{02}z^{-2})} \cdot \frac{(\beta_{10} + \beta_{11}z^{-1})}{(1 + \alpha_{11}z^{-1})} \cdot \frac{(\beta_{20} + \beta_{21}z^{-1} + \beta_{22}z^{-2})}{(1 + \alpha_{21}z^{-1} + \alpha_{22}z^{-2})}$$

where $\alpha_{00}$, $\alpha_{01}$, $\alpha_{02}$, $\alpha_{11}$, $\alpha_{21}$, $\alpha_{22}$, $\beta_{00}$, $\beta_{01}$, $\beta_{02}$, $\beta_{10}$, $\beta_{11}$, $\beta_{20}$, $\beta_{21}$, and $\beta_{22}$, are predetermined constants, and z is a complex variable.

In the specific embodiment, $\alpha_{00} \approx 22/512$, $\alpha_{01} \approx -895/512$, $\alpha_{02} \approx 414/512$, $\alpha_{11} \approx -445/512$, $\alpha_{21} \approx -921/512$, $\alpha_{22} \approx 476/512$, $\beta_{00} \approx 7/64$, $\beta_{01} \approx -3/64$, $\beta_{02} \approx 7/64$, $\beta_{10} \approx 4/64$, $\beta_{11} \approx 4/64$, $\beta_{20} \approx 88/64$, $\beta_{21} \approx -104/64$, and $\beta_{22} \approx 88/64$. The values of the $\alpha$ and $\beta$ coefficients are selected to avoid overflow at nodes of the IIR filter. The $\alpha$ and $\beta$ coefficients are implemented via shifting-and-adding-type multipliers, which scale signal values at the nodes of the IIR filter in accordance with the L-infinity norm.

The novel design of the present invention is facilitated by the second mechanism, which includes unique IIR filters that help minimize inter-carrier interference, compensate for base station pre-equalization filtering and pulse shaping, and achieves an excellent Signal-to-Noise (SNR) ratio.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
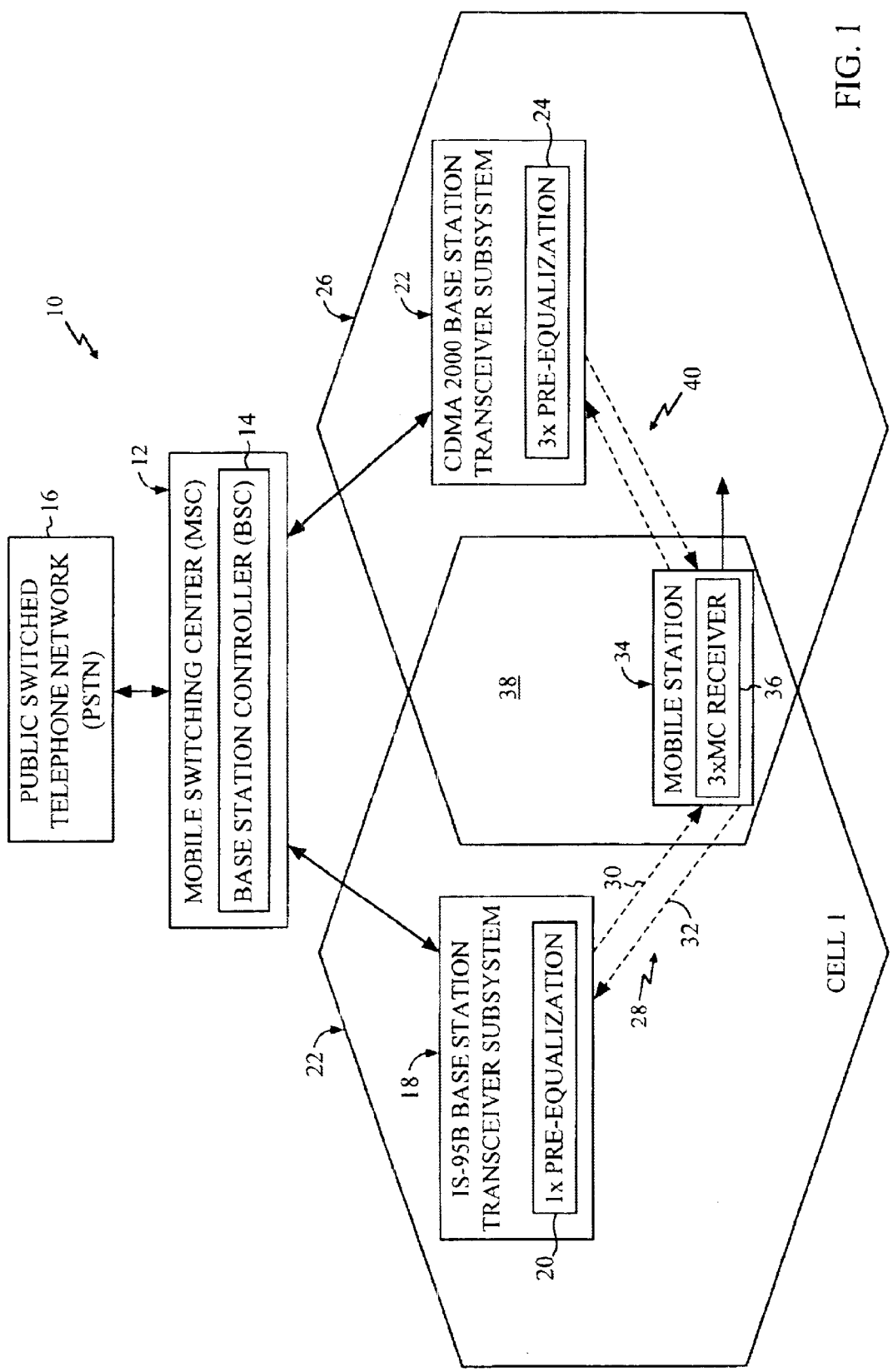
FIG. 1 is a block diagram of an exemplary wireless communications system constructed in accordance with the teachings of the present invention.

FIG. 1 is a block diagram of an exemplary wireless communications system 10 constructed in accordance with the teachings of the present invention. The system 10 includes a mobile switching center (MSC) 12 having a base station controller (BSC) 14. A public switched telephone network (PSTN) 16 routes calls from telephone lines and other networks and communications devices (not shown) to and from the MSC 12. The MSC 12 routes calls from the PSTN 16 to and from a first BTS 18 having a 1× pre-equalization filter 20 and a second BTS 22 having a 3× pre-equalization filter 24. The first BTS 18 is associated with a first cell 22. The second BTS 22 is associated with a second cell 26. The BTS's 18 and 22 are often called cell controllers. In the present discussion, the terms base station and BTS are used interchangeably.

The MSC 12 routes calls between the BTS's 18 and 22. The first BTS 18 directs calls to a mobile station 34 within the first cell 22 via a first communications link 28. The mobile station 34 is a wireless transceiver, such as a wireless phone, which includes a unique 3×MC receiver 36 constructed in accordance with the teachings of the present invention as discussed more fully below.

The communications link 28 is a two-way link having a forward link 30 from the BTS 18 to the mobile station 34 and a reverse link 32 from the mobile station 34 to the BTS 18. Typically, when the BTS 18 has established voice communications with the mobile station 34, the link 28 is characterized as a traffic channel. While only two BTS's 18 and 22 are shown in FIG. 1, more BTS's or fewer BTS's may be employed without departing from the scope of the present invention.

When the mobile station 34 moves from the first cell 22 to the second cell 26, the mobile station 34 is handed off to the second BTS 22 via hard handoff or soft handoff. Soft handoff is often triggered in an overlap region 38. After the mobile station 34 has crossed into the second cell 26, it may drop the first communications link 28. When the mobile station 34 moves from the first cell 22 to the second cell 26, the link 28 to the source BTS 18 is dropped and a new link 40 is formed with the target BTS 22.

The first BTS 18 is an IS-95 BTS that employs the 1× pre-equalization filter 20 and a pulse shaping filter (not shown). The 1× pre-equalization filter 20 accommodates cost-effective anti-aliasing filters in mobile stations (not shown) built in accordance with IS-95A telecommunications industry standards. The base station 18 broadcasts a 1× bandwidth signal over the forward link 32. A 1× bandwidth signal employs a single carrier signal confined to a predetermined frequency band.

In the present exemplary embodiment, the second BTS 22 communicates with the mobile station 34 via 3×MC or 3×DS (Direct Sequence) signals broadcast over the new link 40 between the second BTS 22 and the mobile station 34. The second BTS 22 may operate in 3×DS (Direct Sequence) mode or 3×MC mode. In 3×DS mode, the second BTS 22 employs the 3×DS pre-equalization filter 24 before transmitting 3×DS signals. In 3×MC mode, the second BTS 22 employs a 1× pre-equalization filter (not shown), similar to the 1× pre-equalization filter 20, instead of the 3× pre-equalization filter 24 before transmitting 3×MC signals to the mobile station 34. Those skilled in the art will appreciate that the second BTS 22 may transmit in 3×DS mode only or 3×MC mode only, without departing from the scope of the present invention.

Anti-aliasing filters of the 3×MC receiver 36 of the mobile station 34 do not require pre-equalization. Consequently, the 3×MC receiver 36 compensates for 1× pre-equalization and 3× pre-equalization and pulse shaping effects associated with received multi-carrier signals. Compensating for these pre-equalization effects helps to minimize phase non-linearity of a received multi-carrier signal.

The front end of the receiver 36 selectively compensates for 3× pre-equalization as needed, via Mobile Analog Receive Section (MARS) circuitry (which may be ordered from Qualcomm Incorporated). A special 3×MC filter employed by the 3×MC receiver 36 compensates for 1× pre-equalization, as discussed more fully below. To compensate for pre-equalization, effects added to the transmitted signal by pre-equalization filters, such as the filters 20 and 24, are removed by the 3×MC receiver 36.

The unique 3×MC receiver 36 of the mobile station 38 accommodates both 1× bandwidth signals, 3×DS signals, and 3×MC signals transmitted by the first BTS 18 or the second BTS 22. A special 3×MC filter included in the 3×MC receiver 36 facilitates the accommodation of these signals, as discussed more fully below.

Figure 2:
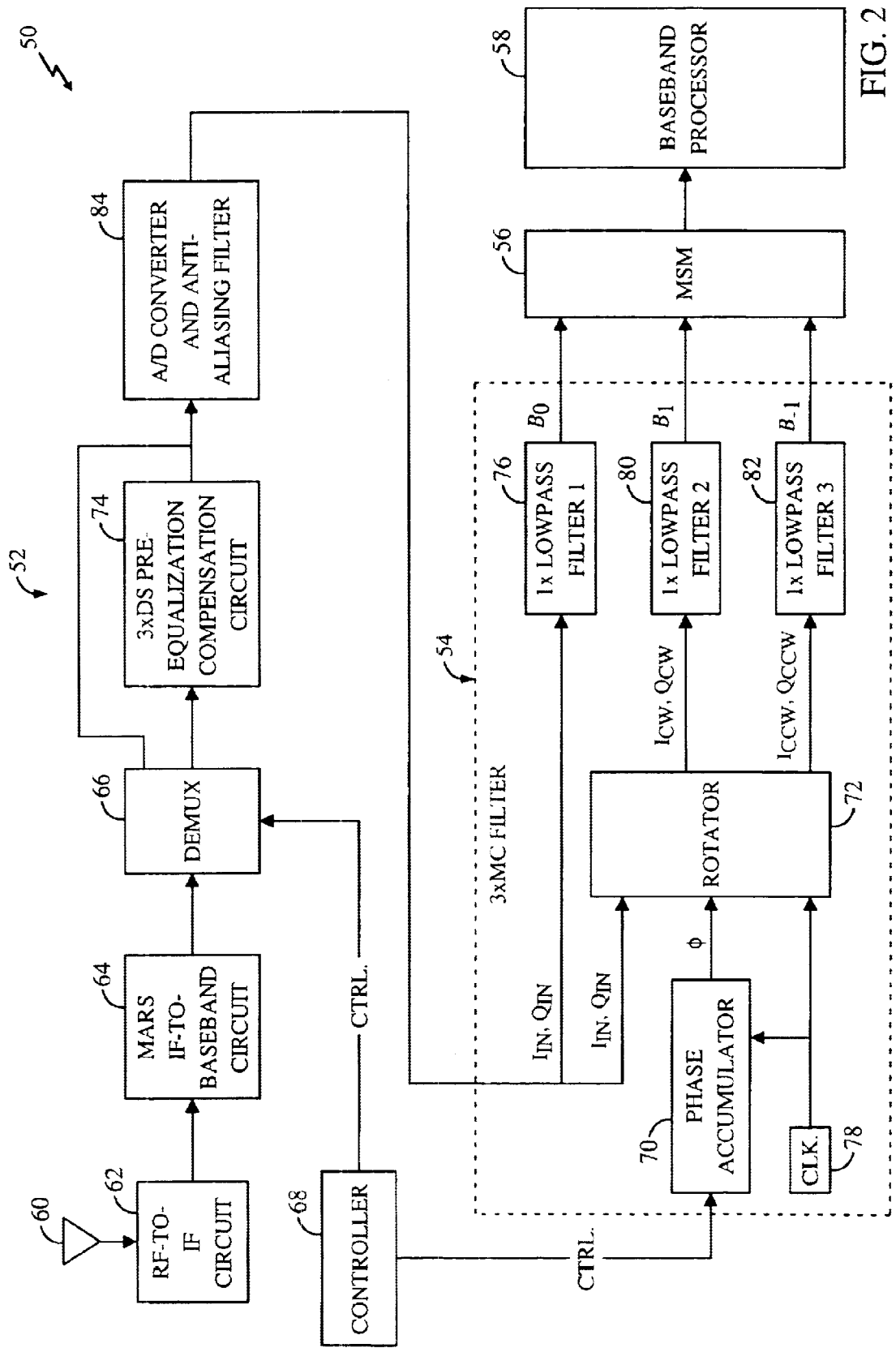
FIG. 2 is a diagram of the wireless communications system receiver of FIG. 1.

FIG. 2 is a diagram of a wireless communications system receiver 50 constructed in accordance with the teachings of the present invention. For clarity, various components, such as amplifiers and power supplies, are omitted from FIG. 2, however one skilled in the art with access to the present teachings will know where and how to implement the additional requisite components.

In the present specific embodiment, the receiver 50 is adapted for use with a wireless phone transceiver (See 34 of FIG. 1.) and a corresponding Code Division Multiple Access wireless communications system (See 10 of FIG. 1.). The receiver 50 includes a front end 52 that communicates with a unique 3×Multi-Carrier (3×MC) filter 54. Outputs of the 3×MC filter 54 are connected to a Mobile Station Modem (MSM) 56. An output of the MSM 56 is connected to a baseband processor 58

The front end 52 includes an antenna 60 in communication with a Radio Frequency to Intermediate Frequency (RF-to-IF) circuit 62. An output of the RF-to-IF circuit 62 is input to a Mobile Analog Receive Section (MARS) style IF-to-baseband circuit 64. An output of the MARS IF-to-baseband circuit 64 is input to a demultiplexer (DEMUX) 66. A controller 68 provides control input to the DEMUX 66 and to a phase accumulator 70 of the 3×MC filter 54.

A first output of the DEMUX 66 is input to an anti-aliasing and Analog-to-Digital (A/D) converter circuit 84. An output of the anti-aliasing and A/D converter circuit 84 is connected to a first input of a rotator 72 and to an input of a first lowpass filter 76 of the 3×MC filter 54. A second output of the DEMUX 66 is input to a 3×DS pre-equalization compensation circuit 74 of the receiver front end 52. An output of the 3×DS pre-equalization compensation circuit 74 is input to the anti-aliasing and A/D converter circuit 84.

The 3×MC filter 54 includes a clock 78 that provides a CHIP×8 (9.8304 MHz) clock signal (8 times the chip rate) to the phase accumulator 70 and the rotator 72. The phase accumulator 70 receives programmable control input from the controller 68 and provides a phase ($\phi$) output to the rotator 72. The anti-aliasing and A/D converter circuit 84 receives a signal having In-phase and Quadrature (I, Q) signal components from the DEMUX 66 or from the 3×DS pre-equalization compensation circuit 74, whichever output is active.

A first output $I_{cw}$ $O_{cw}$ of the rotator 72, which represents a clockwise rotation of an input $I_{in},Q_{in}$ signal, is input to a second lowpass filter 80. A second output $I_{ccw}$ $O_{ccw}$ of the rotator 72, which represents a counter clockwise rotation of the input $I_{in},Q_{in}$ signal, is input to a third lowpass filter 82. Outputs of the first lowpass filter 76, the second lowpass filter 80, and the third lowpass filter 82 are input to the MSM 56 and represent data streams corresponding to a center carrier ($B_0$), a right carrier ($B_1$), and a left carrier ($B_{-1}$), respectively. An output of the MSM 56 is input to the baseband processor 58, which performs additional signal processing to output voice or data and/or interface with software, such as user interface and application software running on the baseband processor 58.

In IS-95A/B CDMA telecommunications systems, a non-linear pre-equalization filter (See 20 and 24 of FIG. 1.) is employed in the base station (See 18 and 22 of FIG. 1.) to accommodate a relatively inexpensive analog anti-aliasing filter in the wireless phone, i.e., mobile station. However, new anti-aliasing filters and Analog-to-Digital Converters (ADC's) do not require base station pre-equalization filter. Consequently, newer 3×MC mobile stations must undo base station pre-equalization for signals received from older IS-95 base stations.

In operation, a Radio Frequency (RF) 3×MC signal is received by the antenna 60. The received 3×MC signal has been transmitted from a transmitter at a base station or other infrastructure (See 18 and 22 of FIG. 1.). In the present specific embodiment, before transmission from the base station, a signal representing a single data stream is encoded, interleaved, and scrambled to yield a stream of Quadrature Phase Shift Keying (QPSK) symbols. The stream of QPSK symbols are then demultiplexed into three separate data streams. Each data stream is multiplied by a different sequence of Walsh chips (Walsh code) and a different Pseudo Noise (PN) sequence. Each of the three data streams are then input to impulse modulators, which convert each symbol stream into an impulse sequence, where the area under the impulse curve is set to the chip energy ($E_c$). The three different impulse streams are then input to filtering circuits that perform pulse shaping and pre-equalization filtering. In CDMA 2000 systems, the pre-equalization filtering is often either 3×DS (3×Direct Spread) pre-equalization or 1×DS pre-equalization. In IS-95 systems, the pre-equalization is 1×DS pre-equalization. The outputs of the filtering circuits are then multiplied by carrier signals that differ in phase to yield a center carrier signal, a right carrier signal, and a left carrier signal which are then added together and transmitted over a wireless channel. The wireless channel adds a noise term, which includes fading and inter-carrier interference, to the summed transmitted signal.

The summed transmitted signal is received by the antenna 60 of the receiver front end 52 and transferred to the RF-to-IF circuit 62. The RF-to-IF circuit 62 converts the received RF signal to an Intermediate Frequency (IF) signal via downconversion circuitry (not shown). The resulting IF signal is then converted to baseband by the MARS IF-to-baseband circuit 64, which includes sampling and down-conversion circuitry (not shown). The IF-to-baseband circuit also includes various filters and amplifiers, such as automatic gain control circuitry, to prepare the signal for further processing, such as 3×DS pre-equalization compensation, anti-aliasing and A/D conversion. In the preferred embodiment, the receiver front end 52 employs MARS type architecture for the RF-to-IF circuit 62 and the IF-to-baseband circuit 64 to help ensure that the signal received at the antenna 60 maintains a linear phase through to the MSM 56.

The controller 68 then determines if the receiver front end 52 should be in a first mode (3×DS mode) or a second mode (1×MC or 3×MC mode) based on the received signal. If the transmitting base station, such as the CDMA 2000 base station 22 of FIG. 1, employs 3×Direct Spread (3×DS) pre-equalization, then the front end 52 is placed in the first mode, and the front end 52 undoes the 3×DS pre-equalization via the 3×DS pre-equalization compensation circuit 74.

If the transmitting base station, such as the base stations 18 or 22 of FIG. 1 transmits a 1×MC signal or a 3×MC signal, where each carrier is pre-equalized by an IS-95A/B pre-equalization filter, then the receiver front end 52 is placed in a second mode. When in the second mode, the 3×DS pre-equalization compensation circuit 74 is bypassed via the DEMUX 66 in response to a signal from the controller 68. Hence, received signals that have been 3×DS pre-equalized are compensated for 3×DS pre-equalization, while the 1× bandwidth pre-equalized 1× and 3×MC signals are not compensated for 3×DS pre-equalization. The 3×MC filter 54 compensates for any IS-95 1×-bandwidth pre-equalization filtering employed by the transmitting base stations 18 and 22 for 1× and 3×MC signals.

If the received signal has been 3×DS pre-equalized, then the controller 68 switches the front end 52 into 3×DS mode via the control signal to the DEMUX 66. In the first mode, the signal output from the MARS IF-to-Baseband circuit 64 is passed to the 3×DS pre-equalization compensation circuit 74 via a second output of the DEMUX 66. The first output of the DEMUX 66, which is input to the anti-aliasing and A/D converter circuit 84, is disabled. 3×DS pre-equalization compensation circuit 74 compensates the received signal for 3×DS pre-equalization by performing an inverse of the filtering process employed by the base station to 3×DS pre-equalize the signal. The compensated signal is then output to the 3×DS pre-equalization compensation circuit 74.

If the received signal has not been 3×DS pre-equalized, then the 3×DS pre-equalization compensation circuit 74 is bypassed. The control signal output from the controller 68 enables the first output of the DEMUX 66 and disables the second output of the DEMUX 66, which is input to the 3×DS pre-equalization compensation circuit 74.

Those skilled in the art will appreciate that a different receiver front end may be employed in place of the receiver front end 52 without departing from the scope of the present invention. For example, if a Baseband Analog Processor (BBA) IF-to-baseband circuit is employed, then the 3×DS pre-equalization compensation circuit 74 is not easily bypassed, and 3×DS pre-equalization compensation is automatically performed even when not required. Consequently, in the first mode, a 3×DS pre-equalization filter (not shown) similar to that employed by the transmitting base station (not shown) is included after the 3×DS pre-equalization compensation circuit 74 to undue unnecessary 3×DS pre-equalization compensation. 3×DS pre-equalization compensation is unnecessary when the received signal is from an IS-95A/B base station (See 18 of FIG. 1.) that does not employ 3×DS pre-equalization.

In the present specific embodiment, the front end 52 employs MARS-type architecture, which accommodates selective bypassing of the pre-equalization compensation circuit 74. Those skilled in the art will appreciate that the receiver front end 52 may be replaced by a conventional MARS receiver front end that lacks the DEMUX 66 and is pre-set to a certain mode without departing from the scope of the present invention. Such a MARS receiver front end may be purchased from Qualcomm Incorporated.

The individual carriers to be extracted by the 3×MC filter 54 are 1× bandwidth signals and include a center carrier, a left carrier, and a right carrier. The left carrier ($B_{-1}(n)$) of the received 3×MC signal, which is a digital signal having I and Q signal components, is rotated counterclockwise (by 1.25 MHz for USA-PCS applications) and then filtered via the second 1× bandwidth lowpass filter 82. Similarly, the right carrier ($B_1(n)$) is demodulated by first rotating the received 3×MC signal rotated clockwise (by 1.25 MHz for USA-PCS applications) and then filtering the rotated signal via the third 1× bandwidth lowpass filter 80. To extract the center carrier ($B_0(n)$), the received 3×MC signal is filtered by the first 1× bandwidth lowpass filter 76 and does not require pre-rotation by the rotator 72.

The output of the 3×DS pre-equalization compensation circuit 74 is input to the anti-aliasing and A/D converter circuit 84. Input to the anti-aliasing and A/D converter circuit 84 has either been compensated for before 3×DS pre-equalization or has not been 3×DS pre-equalized. The signal input to the anti-aliasing and A/D converter circuit 84 is converted from an analog signal to a digital signal via A/D converters and then filtered via anti-aliasing filters of the anti-aliasing and A/D converter circuit 84, which outputs a digital stream of In-phase (I) and Quadrature (Q) symbols to the rotator 72 and to the first lowpass filter 76. The stream of I and Q symbols ($I_{in}$, $Q_{in}$) output from the anti-aliasing and A/D converter circuit 84 represents a digital 3×MC signal (s(n)), which is the sum of three separate signals. The output signal s(n) may be written as (excluding noise and other effects to be removed by filtering):

$$s(n)=I(n)+jQ(n)=B_0(n)+B_1(n)e^{j\omega_0 nT_s}+B_{-1}(n)e^{-j\omega_0 nT_s}, \quad [1]$$

where n is an integer time variable which specifies a given position of a bit in a digital sequence;

$\omega_0$ is the frequency spacing between carrier signals and is approximately 1.23 MHz, 1.25 MHz, or 1.225 MHz for USA Cell systems, USA-PCS systems, or Japan systems respectively; $T_s$ is the digital sampling period; I(n) is the in-phase signal component; Q(n) is the quadrature signal component; $B_0(n)$ is the digital signal associated with the center carrier; $B_1(n)e^{j\omega_0 nT_s}$ is the digital signal associated with the right carrier; and $B_{-1}(n)e^{-j\omega_0 nT_s}$ is the digital signal associated with the left carrier; and where noise terms and other terms (such as those caused by pre-equalization effects) to be later filtered are not specified.

The 3×MC filter 54 extracts the three carrier signals $B_0(n)$, $B_1(n)$, and $B_{-1}(n)$ from the complex signal s(n) input to the 3×MC filter 54 from the anti-aliasing and A/D converter circuit 84. To extract $B_0(n)$, the signal s(n) is lowpass filtered by the first lowpass filter 76. To extract $B_1(n)$, the signal s(n) is rotated clockwise by $\omega_0 T$, and then lowpass filtered by the second lowpass filter 80. To extract $B_{-1}(n)$, the signal s(n) is rotated counterclockwise by $\omega_0 nT_s$ and then lowpass filtered by the third lowpass filter 82. Clockwise rotation of the signal s(n) by $\omega_0 nT_s$ is equivalent to multiplication of the signal by $e^{-j\omega_0 T_s}$. Note that multiplication of the term $B_1(n)e^{j\omega_0 nT_s}$ by $e^{-j\omega_0 T_s}$ yields $B_1(n)$. Similarly, counterclockwise rotation of the component $B_{-1}(n)e^{-j\omega_0 nT_s}$, i.e., multiplication by $e^{j\omega_0 T_s}$ yields $B_{-1}(n)$.

The rotator 72 is a unique Look-Up Table (LUT) rotator that rotates the input $I_{in}$, $Q_{in}$ signal s(n) clockwise by the angle $\phi=\omega_0 nT_s$ and outputs the signal $I_{cw}$, $Q_{cw}$ to the second lowpass filter 80 in response thereto. The rotator 70 also rotates the input $I_{in}$, $Q_{in}$ signal s(n) counterclockwise the by angle $\phi=\omega_0 nT_s$ and outputs the signal $I_{ccw}$, $Q_{ccw}$ to the third lowpass filter 82 in response thereto.

In the present specific embodiment, the lowpass filters 76, 80, and 82 are 5$^{th}$ order elliptic Infinite Impulse Response (IIR) filters which help minimize inter-carrier interference, compensate for IS-95A/B 1× bandwidth pre-equalization to minimize overall phase non-linearity, and closely match the base station's (not shown) pulse shaping to maximize Signal-to-Noise Ratio (SNR). The unique design of the filters 76, 80, and 82 is discussed more fully below.

The signals $B_0(n)$, $B_1(n)$, and $B_{-1}(n)$ output from the first lowpass filter 76, the second lowpass filter 80, and the third lowpass filter 82, respectively, represent three data streams, which are input to the MSM 56. The MSM 56 performs further signal processing in preparation for use by various software programs and/or hardware algorithms running on the baseband processor 58 that facilitate voice or data output or other wireless phone functions. For example, the MSM 56 may include circuitry for complex Pseudo Noise (PN) despreading each carrier ($B_0$, $B_1$, $B_{-1}$), Walsh code multiplication, bit summation over a symbol period, decision logic, and one or more multiplexers for multiplexing the resulting data streams ($Z_0$, $Z_1$, $Z_{-1}$) associated with the carriers $B_0$, $B_1$, $B_{-1}$ onto a single Quadrature Phase Shift Keying (QPSK) data stream to facilitate further processing by the baseband processor 58. The MSM 56 may be implemented with a conventional 3×MC MSM built in accordance with Telecommunications Industry Association (TIA) standards. Alternatively, an appropriate MSM may be ordered from Qualcomm Incorporated.

Those skilled in the art may employ conventional baseband processors and MSM's or modify existing modules for use in the system 50 to meet the needs of a given application. In some applications, the MSM 56 will include a sequencer or multiplexer to splice the data streams $B_0(n)$, $B_1(n)$, and $B_{-1}(n)$ back into a single data stream.

Figure 3:
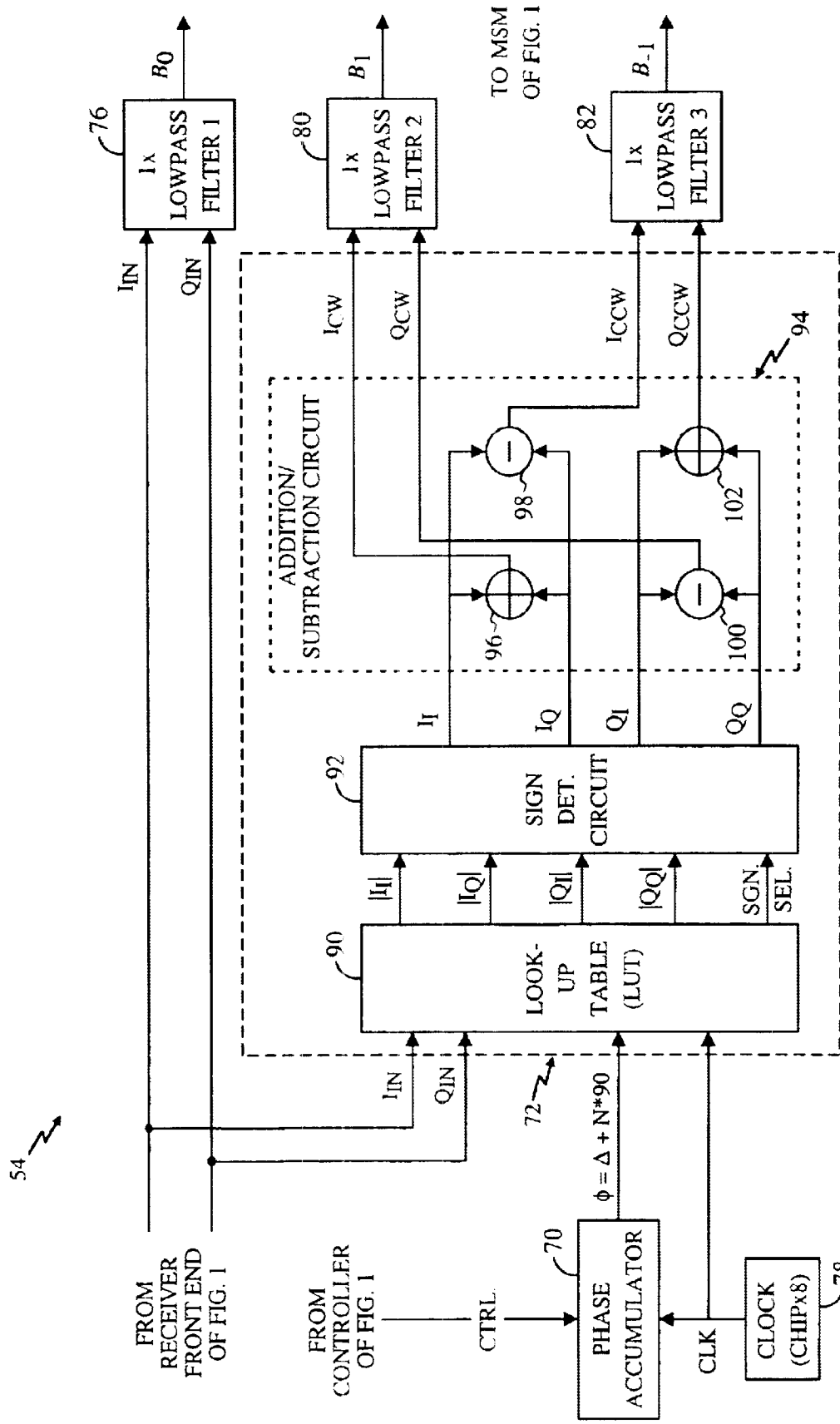
FIG. 3 is a more detailed diagram of the unique 3×MC filter of FIG. 2.

FIG. 3 is a more detailed diagram of the unique 3×MC filter 54 of FIG. 2. The rotator 72 is expanded in FIG. 3 to show a Look-Up Table (LUT) 90 that receives $I_{in}$ and $Q_{in}$ signal components from the anti-aliasing and A/D converter circuit 84 of FIG. 2, a programmable phase input $\phi=\Delta+N*90$ (where N is an integer between 0 and 4 specified by bits 5 and 4 of the digital phase signal $\phi$) from the phase accumulator 70, and a CHIP×8 clock signal from the clock 78. The LUT 90 outputs the absolute values or magnitudes of first ($I_I$, $I_Q$) and second ($Q_I$, $Q_Q$) components of rotated $I_{in}$ and $Q_{in}$ components, which are input to the LUT 90, to a sign determination circuit 92. The sign determination circuit 92 determines signs to be associated with the magnitudes output from the LUT 90 so that when selectively added by a subsequent addition/subtraction circuit 94, they yield clockwise and counter clockwise rotated versions of the $I_{in},Q_{in}$ signal input to the LUT 72. The resulting clockwise and counterclockwise rotated signals, which have been rotated by the angle $\phi$ (as output from the phase accumulator 70) and $-\phi$, respectively, are input to the second low-pass filter 80 and the third lowpass filter 82, respectively.

The unique lowpass filters 76, 80, and 82 help maximize SNR by matching base station pulse shaping, compensating for 1× bandwidth pre-equalization, and minimizing intercarrier interference, as discussed more fully below. The filtered signals ($B_0$ $B_1$, $B_{-1}$) output from the lowpass filters 76, 80, and 82 are input to the MSM 56 of FIG. 2.

The phase accumulator 70 generates a phase offset that is used by the rotator 72. The rotator 72 is coupled to a non-saturating accumulator 70 that takes a fixed frequency offset and accumulates on it. The bit width selection of the accumulator 70 is chosen so that quantization error resulting from each addition is minimized while not exceeding the demodulation tolerance, which is 10 HZ in the present specific embodiment.

Construction details of the phase accumulator 70 are application-specific. With access to the present teachings, one skilled in the art may construct the phase accumulator 70 to meet the needs of a given application. In the present specific embodiment, the phase accumulator 70 includes a programmable micro register (not shown) that provides an L-bit wide signal to a first input of an adder (not shown), where L is the input frequency bit width. An output of the adder is an N-bit wide signal that is input to a second register (not shown) that is clocked at CHIP×8=9.8304 MHz. An output of the second register represents the output of the phase accumulator 70 and is fed back to a second input of the adder.

In the preferred embodiment, the output bit width N of the phase accumulator 70 satisfies the relation $360*2^{-N} = 360*10*(CHIP\times8)^{-1}$), so that N=20. Since the maximum frequency offset is $2^L*10=1.25*10^6$ for USA-PCS systems, the input frequency bit width L=17. Hence, to minimize quantization error, the output bit width N the phase accumulator 70 is set to approximately 20, and the input frequency bit width L is set to 17. The quantization error per addition should not exceed the demodulation tolerance of 10 Hz.

The phase $\phi$ output by the phase accumulator 70 is programmable via input from the controller 68 to the micro register (not shown) of the phase accumulator 70. In the present specific embodiment, the phase $\phi$ is a six-bit digital that specifies angles between 0° and 360° in steps ($\Delta$'s) of $360/2^6=5.625°$. Bits 5 and 4 of $\phi$ specify four quadrants (0°, 90°, 180°, 270°) between 0° and 360°, and bits 3 through 0 represent one of 16 possible values within the quadrant specified by bits 5 and 4. The phase $\phi$ is biased so that when bits 3 through 0 are zero, the phase $\phi$ is equivalent to the phase specified by bits 5 and 4 plus $5.625°/2=2.8125°$. For example, a phase of 2.8125° corresponds to $\phi=(00\ 0000)$; a phase of 92.8125° corresponds to $\phi=(01\ 0000)$; and a phase of 188.4375 corresponds to $\phi=(10\ 0001)$.

The $I_{in},Q_{in}$ signal (S) input to the LUT 72 may be written in complex form as $I_{in}+jQ_{in}$. As is known in the art, multiplication of a complex number by $e^{-j\phi}$ corresponds to clockwise rotation of the vector ($I_{in}$, $Q_{in}$) by $\phi$. Euler's formula specifies that $e^{-j\phi}=\cos\phi-j\sin\phi$. Consequently, a clockwise rotated version ($S_{cw}$) of the $I_{in},Q_{in}$ signal S may be written as:

$$S_{cw} = Se^{-j\phi} = (I_{in}+jQ_{in})(\cos\phi - j\sin\phi) \quad [2]$$
$$= (I_{in}\cos\phi + Q_{in}\cos(90-\phi)) + j(Q_{in}\cos\phi - I_{in}\cos(90-\phi))$$
$$= I_{cw} + jQ_{cw},$$

where $I_{cw}$ is a first component of the clockwise rotated signal $S_{cw}$; $Q_{cw}$ is a second component of the signal $S_{cw}$; and the relation $\sin\phi=\cos(90-\phi)$ is employed.

A counterclockwise rotated version ($S_{ccw}$) of the $I_{in},Q_{in}$ signal S may be written $$S_{ccw} = Se^{j\phi} = (I_{in}+jQ_{in})(\cos\phi + j\sin\phi) \quad [3]$$
$$= (I_{in}\cos\phi + Q_{in}\cos(90-\phi)) + j(Q_{in}\cos\phi + I_{in}\cos(90-\phi))$$
$$= I_{ccw} + jQ_{ccw},$$

where $I_{ccw}$ is a first component of the counterclockwise rotated signal $S_{ccw}$, and $Q_{ccw}$ is a second component of the signal $S_{ccw}$.

With reference to equation (2), $I_{cw}$ may be written as $I_{cw}=I_{cwI}+I_{cwQ}$, where $I_{cwI}=I_I=I_{in}\cos\phi$, and $I_{cwQ}=I_Q=Q_{in}\cos(90-\phi)$, and where $I_{cwI}$ and $I_{cwQ}$ are first and second components of $I_{cw}$, respectively. $Q_{cw}$ may be written as $Q_{cwI}+Q_{cwQ}$ where $Q_{cwI}=Q_I=Q_{in}\cos\phi$ and $Q_{cwQ}=-Q_Q=-I_{in}\cos(90-\phi)$, and where $Q_{cwI}$ and $Q_{cwQ}$ are first and second components of $Q_{cw}$, respectively.

Similarly, with reference to equation (3), $I_{ccw}$ may be written as $I_{ccw}=I_{ccwI}+I_{ccwQ}$, where $I_{ccwI}=I_I=I_{in}\cos\phi$ and $I_{ccwQ}=-I_Q=-Q_{in}\cos(90-\phi)$, where $I_{ccwI}$ and $I_{ccwQ}$ are first and second components of $I_{ccw}$, respectively. $Q_{ccw}$ may be written as $Q_{ccwI}+Q_{ccwQ}$ where $Q_{ccwI}=Q_I=Q_{in}\cos\phi$ and $Q_{ccwQ}=Q_Q=I_{in}\cos(90-\phi)$, and where $Q_{ccwI}$ and $Q_{ccwQ}$ are first and second components of $Q_{ccw}$, respectively.

Hence, $$I_{cw}=I_I+I_Q,$$

$$Q_{cw}=Q_I-Q_Q, \quad [4]$$

$$I_{ccw}=I_I-I_Q,$$

$$Q_{ccw}=Q_I+Q_Q, \quad [4]$$

Therefore, to obtain individual components of $S_{cw}$ and $S_{ccw}$, $I_I$, $I_Q$, $Q_I$, and $Q_Q$ are selectively added or subtracted. This selective addition and/or subtraction is implemented by the addition/subtraction circuit 94, as discussed more fully below.

The phase $\phi$ may be written as:

$$\phi=\Delta+N*90° \quad [5]$$

where N is an integer in the set $\{0, 1, 2, 3\}=\{00, 01, 10, 11\}$ that identifies first, second, third, and fourth quadrants, respectively; $0°<\Delta<90°$ and is digitally represented by four bits and represents one of sixteen equally spaced values between 0° and 90°.

The LUT 90 determines $I_I$, $I_Q$, $Q_I$, and $Q_Q$ based on a table of stored values of $I_{in}\cos(\Delta+N*90°)$, $Q_{in}\cos(90-(\Delta+$ N*90°)), $Q_{in}$ cos(Δ+N*90°), and $I_{in}$ cos(90–(Δ+N*90°)), where Δ is specified by bits three through zero (PHASE (3:0)) of the six-bit phase output by the phase accumulator 70 to the LUT 90, and where N is specified by bits 5 and 4 (PHASE(5:4)) of the output of the phase accumulator 70.

Due to the properties of the cosine function, cos(Δ+N*90°), cos(90–(Δ+N*90°)) are either +/–cos(Δ) or +/–cos(90–Δ) as indicated in Table 1 below. This property helps simplify the LUT 90, which only needs to store magnitudes associated with cos(Δ) or cos(90–Δ).

TABLE 1

| Phase(5:4)→N | Cos(Δ + N * 90°) | cos(90 – (Δ + N * 90°)) |
|---|---|---|
| 00 → 0 | cos(Δ) | cos(90 – Δ) |
| 01 → 1 | –cos(90 – Δ) | cos(Δ) |
| 10 → 2 | –cos(Δ) | –cos(90 – Δ) |
| 11 → 3 | cos(90 – Δ) | –cos(90 – Δ) |

Note that Δ and 90°–Δ=Δ' are bitwise complements. Hence, LUT 90 only must store the sixteen values associated with cos Δ since cos(90–Δ) will represent a value that is already stored. For example, if the first stored value of Δ is Δ=2.81250°, then 90°–Δ=87.1875° represents the sixteenth value of Δ stored in the LUT 90.

Products between $I_{in}$ and cos(Δ) or cos(90–Δ) and between $Q_{in}$ and cos(Δ) or cos(90–Δ) may be performed via multipliers in the LUT 90. However, preferably products are predetermined and quantized into a predetermined table of values.

When $I_{in}$ and $Q_{in}$ are positive (0), the signs associated with the cosine values in Table 1 are determined by the sign determination circuit 92 in accordance with the following table where + is represented by 0 and – is represented by 1:

TABLE 2

| PHASE(5:4)→N | Sign of: $I_I$ | Sign of: $Q_I$ | Sign of: $I_Q$ | Sign of: $Q_Q$ |
|---|---|---|---|---|
| 00 → 0 | 0 = + | 0 = + | 1 = – | 0 = + |
| 01 → 1 | 1 = – | 0 = + | 1 = – | 1 = – |
| 10 → 2 | 1 = – | 1 = – | 0 = + | 1 = – |
| 11 → 3 | 0 = + | 1 = – | 0 = + | 0 = + |

Note that the sign of $I_I$ is PHASE(5) xor PHASE(4), which is the same as the sign of $Q_Q$; the sign of $Q_I$ is equal to PHASE(5); and the sign of $I_Q$ is the inverse of PHASE(5), i.e., Inv(PHASE(5)), where xor is the exclusive OR operator.

In the following Table 3, the signs of associated with the cosine values in Table 1 are determined by the sign determination circuit 92 with reference to a sign select signal from the LUT 90 that specifies the initial sign of $I_{in}$ and $Q_{in}$. In the present specific embodiment, the sign select signal that specifies the sign of $I_{in}$ or $Q_{in}$ is the most significant bit (MSB) of $I_{in}$ or $Q_{in}$, respectively.

TABLE 3

| Select Signal: | Sign of: $I_I$ | Sign of: $Q_I$ | Sign of: $I_Q$ | Sign of: $Q_Q$ |
|---|---|---|---|---|
| PHASE(5:4), MSB of $I_{in}$, MSB of $Q_{in}$. | PHASE(5) xor PHASE(4) Xor (MSB of $I_{in}$) | PHASE(5) xor (MSB of $Q_{in}$) | Inv(PHASE(5)) xor (MSB of $I_{in}$) | PHASE(5) xor PHASE(4) xor (MSB of $Q_{in}$) |

The sign determination circuit 92 is a logic circuit that determines the signs of $I_I$, $I_Q$, $Q_I$, and $Q_Q$ in accordance with Table 3. With access to the present teachings, one skilled in the art may design a logic circuit in accordance with Table 3 without undue experimentation.

Those skilled in the art will appreciate that the rotator 72 may be replaced with a different type of rotator, such as a Cordic rotator, without departing from the scope of the present invention.

The sign determination circuit 92 receives the absolute values of $I_I$, $I_Q$, $Q_I$, and $Q_Q$ from the LUT 90 along with the sign select signal and outputs signed values of $I_I$, $I_Q$, $Q_I$, and $Q_Q$ in response thereto to the addition/subtraction circuit 94.

The absolute values of $I_I$, $I_Q$, $Q_I$, and $Q_Q$ are:

$|I_I|=|I_{in}\cos\Delta|$ $|I_Q|=|I_{in}\cos\Delta'|$ $|Q_I|=|Q_{in}\cos\Delta|$ $|Q_Q|=|Q_{in}\cos\Delta'|$ [6]

respectively.

The addition/subtraction circuit 94 includes a first adder 96, a second adder 102, a first subtractor 98 and a second subtractor 100. The first adder 96 receives $I_I$ and $I_Q$ as input from the sign determination circuit 92 and provides $I_{cw}$ as output to the second lowpass filter 80 in response thereto. The first subtractor 98 receives $I_I$ and $I_Q$ as input from the sign determination circuit 92 and provides $I_{ccw}=I_I–I_Q$ as output to the third lowpass filter 82 in response thereto. The second subtractor 100 receives $Q_I$ and $Q_Q$ as input from the sign determination circuit 92 and provides $Q_{cw}=Q_I–Q_Q$ as output to the second lowpass filter 80 in response thereto. The second adder 102 receives $Q_I$ and $Q_Q$ as input and provides $Q_{ccw}=Q_I+Q_Q$ as output to the third lowpass filter 82 in response thereto. Hence, the second lowpass filter 80 receives the clockwise rotated signal specified by $I_{cw}$ and $Q_{cw}$ as input; the third lowpass filter 82 receives the counterclockwise rotated signal specified by $I_{ccw}$ and $Q_{ccw}$ as input; and the first lowpass filter 76 receives the non-rotated signal $I_{in}$ and $Q_{in}$ as input.

The first lowpass filter 76, the second lowpass filter 80, and the third lowpass filter 82 include fifth order elliptic IIR filters as discussed more fully below. The elliptic IIR filters maximize SNR by compensating for IS-95A/B base station 1× bandwidth pre-equalization, minimizing inter-carrier interference, and closely matching base station pulse shaping. The lowpass filters 76, 80, and 82 yield data streams associated with the center carrier ($B_0$), the right carrier ($B_1$), and the left carrier ($B_{–1}$), respectively, as discussed more fully below. In the present specific embodiment, the lowpass filters 76, 80, and 82 are identical.

Figure 4:
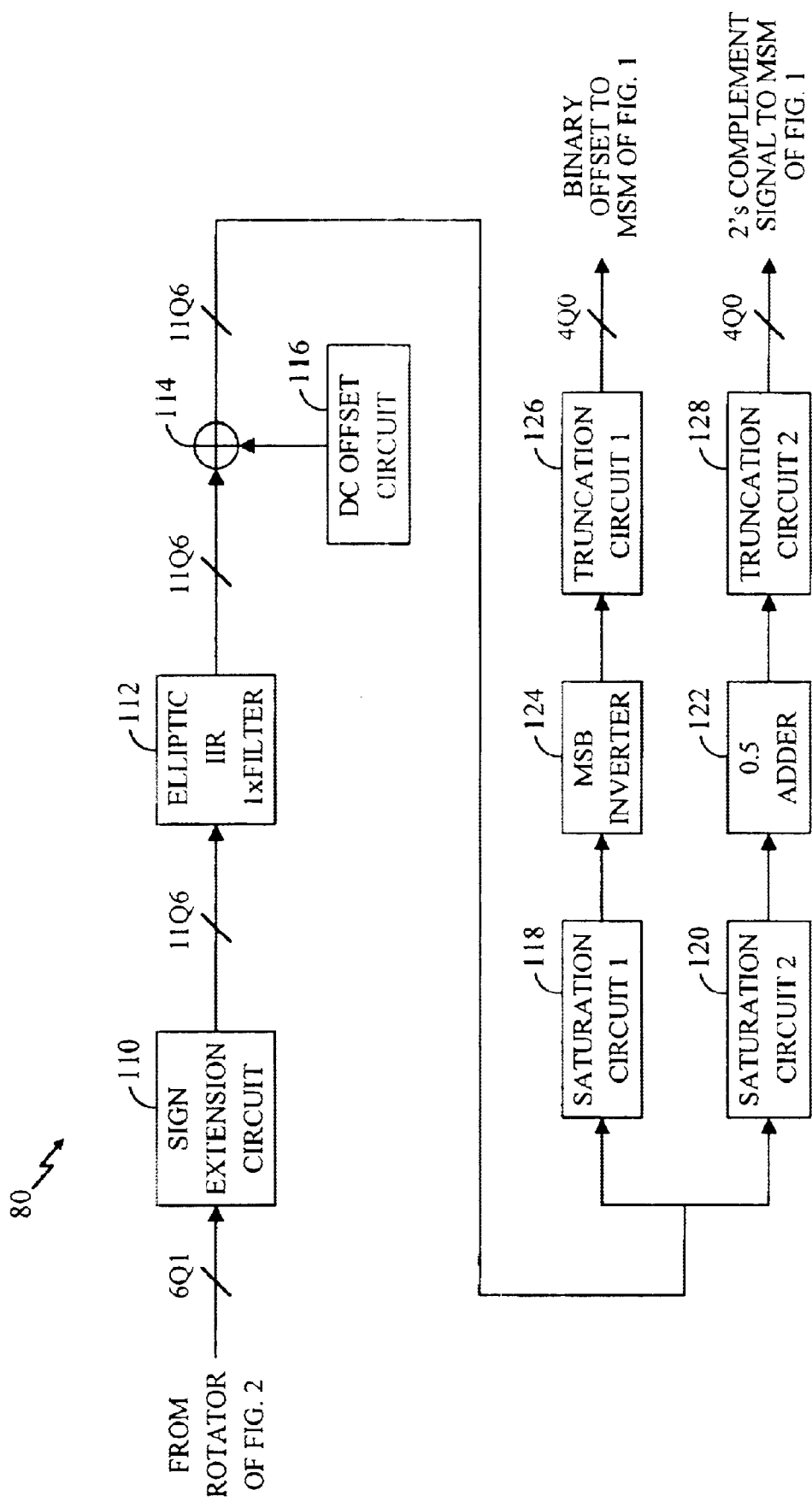
FIG. 4 is a more detailed diagram of the 1× lowpass filter of FIG. 3.

FIG. 4 is a more detailed diagram of the second 1× lowpass filter 80 of FIG. 3. The first lowpass filter 76 and the third lowpass filter 82 of FIG. 3 are similar to the second lowpass filter 80 of FIG. 4. For clarity, various components are omitted from FIG. 4, such as power supplies and clocks, however one skilled in the art with access to the present teachings will know where and how to implement the additional requisite components. In the present specific embodiment, the various modules 110 though 128 of FIG. 4 are digital circuits that are clocked at CHIP×8, which refers to 8 times the chip rate (9.8304 MHz).

The lowpass filter 80 includes a sign extension circuit 110 that receives a 6Q1 bit wide input from the rotator 72 of FIG. 3 and provides an 11Q6 output to an elliptic IIR filter 112. The notation xQy represents a 2's complement number having x+y bits which include a sign bit, where the last y bits are to the right of a binary point. The elliptic IIR filter 112 outputs an 11Q6 bit wide signal to a first input of a first digital adder 114. A second input of the first digital adder 114 is connected to an output of a DC offset circuit 116, which outputs a predetermined DC offset value. An 11Q6 output of the digital adder 114 is input to a first saturation circuit 118 and a second saturation circuit 120. An 11Q6 output of the first saturation circuit 118 is input to a Most Significant Bit (MSB) inverter 124, which inverts the sign of the input value and provides an 11Q6 output to a first truncation circuit 126 in response thereto. An output of the first truncation circuit 126 represents a 4Q0 offset binary signal, which corresponds to the right carrier B, and is input to the MSM 56 of FIG. 2. An 11Q6 output of the second saturation circuit 120 is input to a second digital adder 122, which adds 0.5 to the input. An 11Q6 output of the second digital adder 122 is input to a second truncation circuit 128, which provides a 4Q0 2's complement output signal, which represents a data stream associated with the right carrier $B_1$ to the MSM 56 of FIG. 2.

In operation, the sign extension circuit 110 extends the 6Q1 bit wide input signal from the rotator 72 of FIG. 3 to an 11Q6 signal via methods known in the art. The elliptic IIR filter 112 filters the sign-extended 11Q6 signal, as discussed more fully below, and provides the filtered 11Q6 signal to the first digital adder 114, which adds a predetermined DC offset provided by the DC offset circuit 116. The exact value of the DC offset is application-specific and may be set by one skilled in the art to meet the needs of a given application. The DC offset circuit 116 includes a programmable micro register (not shown) to facilitate programming the DC offset value. The filtered and DC-offset-adjusted signal output from the first digital adder 114 is then converted to 4Q0 precision via two different modes that provide outputs in two different formats, namely offset binary and 2's complement formats.

In a first mode, the first saturation circuit 118 saturates the 11Q6 signal output from the first digital adder 114. The most significant bit of the resulting saturated signal is then inverted by the MSB inverter 124, and the result is truncated by the first truncation circuit 126 to yield a 4Q0 output signal with a maximum truncation error of 0.5. In the present specific embodiment, the truncation circuits 126 and 128 employ coefficient quantization instead of rounding quantization.

In the second mode, the second saturation circuit 120 saturates the 11Q6 signal output from the first digital adder 114. The second digital adder 122 adds 0.5 to the resulting saturated signal to eliminate a non-zero error mean. The resulting signal is truncated to 4Q0 precision and output to the MSM 56 of FIG. 2.

Those skilled in the art will appreciate that only one digital output format may be provided without departing from the scope of the present invention. For example, the circuits 118, 124, and 126 may be omitted.

In the present specific embodiment, truncation quantization instead of rounding quantization is employed. Although truncation quantization may yield a non-zero mean, this non-zero mean is removed by the addition of a DC offset by the DC offset circuit 116, which includes a UP/DSP register (not shown). The exact amount of DC offset required may be determined through simulation by one skilled in the art. To perform the simulation, one may employ random 3×MC signals generated by a CDMA Arbitrary Waveform Generator (CAWG) program and record the output means.

Figure 5:
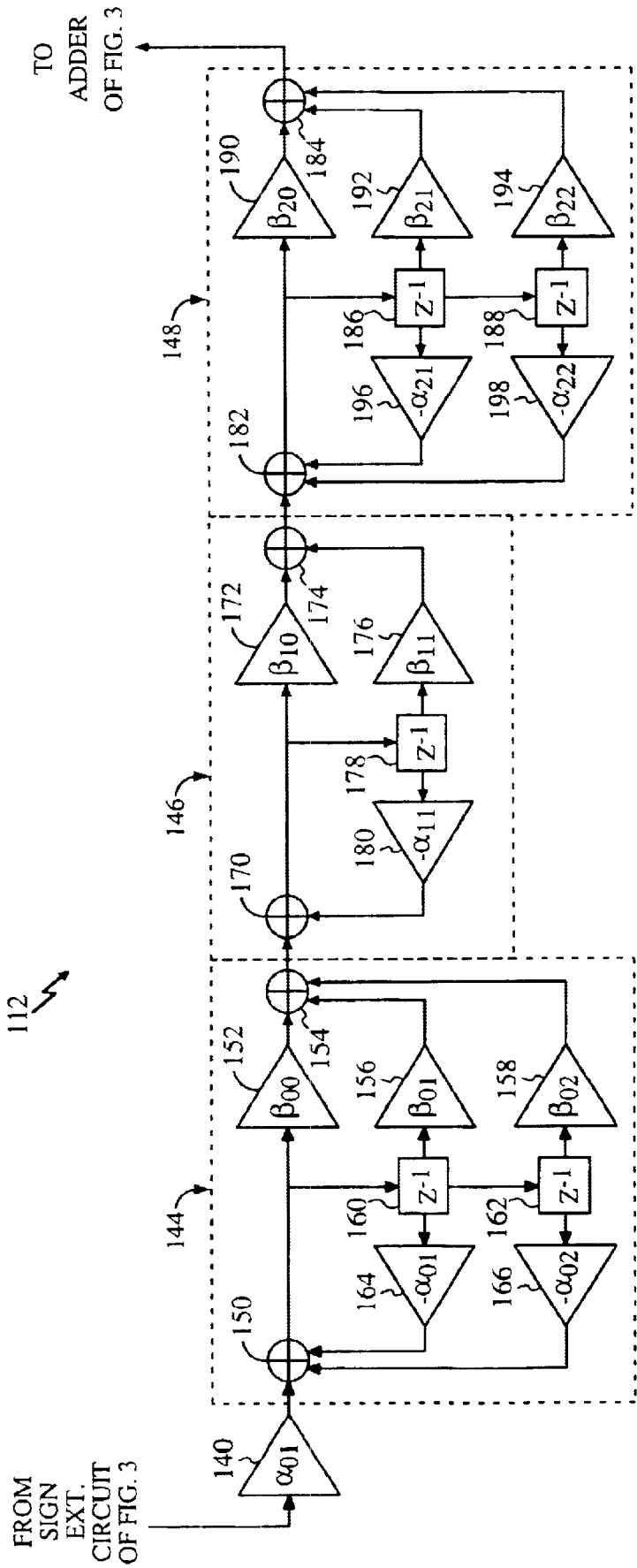
FIG. 5 is a more detailed diagram of the elliptic Infinite Impulse Response (IIR) filter of FIG. 4.

FIG. 5 is a more detailed diagram of the elliptic Infinite Impulse Response (IIR) filter 112 of FIG. 4. The elliptic IIR filter 112 has a cascade direct form II filter structure that includes a first or coefficient multiplier ($\alpha_{00}$) 140 that receives an 11Q6 input signal from the sign extension circuit 110 of FIG. 4 and provides an output to a first filter section 144. An output of the first filter section 144 is input to a second filter section 146. An output of the second filter section 146 is input to a third filter section 148.

The first filter section 144 includes a first adder 150, a first β coefficient multiplier ($\beta_{00}$) 152, a second adder 154, a second β coefficient multiplier ($\beta_{01}$) 156, a third β coefficient multiplier ($\beta_{02}$) 158, a first digital delay element ($z^{-1}$) 160, a second digital delay element ($z^{-1}$) 162, a second α coefficient multiplier ($\alpha_{01}$) 164, and a third β coefficient multiplier ($-\alpha_{02}$) 166. Inputs of the first adder 150 are connected to outputs of the first α coefficient multiplier ($\alpha_{00}$) 140, the second α coefficient multiplier ($-\alpha_{01}$) 164, and the third α coefficient multiplier ($-\alpha_{02}$) 166. An output of the first adder 150 is connected to an input of the first β coefficient multiplier ($\beta_{00}$) 152 and to an input of the first digital delay element ($z^{-1}$) 160. An output of the first digital delay element ($z^{-1}$) 160 is connected to an input of the second α coefficient multiplier ($-\alpha_{01}$) 164, to an input of the second digital delay element ($z^{-1}$) 162, and to an input of the second β coefficient multiplier ($\beta_{01}$) 156. An output of the second digital delay element ($z^{-1}$) 162 is connected to an input of the third α coefficient multiplier ($-\alpha_{02}$) 166 and to an input of the third β coefficient multiplier ($\beta_{02}$) 158. Outputs of the second β coefficient multiplier ($\beta_{01}$) 156 and the third β coefficient multiplier ($\beta_{02}$) 158 are input to the second adder 154, which provides the output of the first filter section 144.

The first α coefficient multiplier ($\alpha_{00}$) 140 and the first filter section 144 implement the following function $H_0(z)$:

$$H_0(z) = \alpha_{00} \frac{(\beta_{00} + \beta_{01}z^{-1} + \beta_{02}z^{-2})}{(1 + \alpha_{01}z^{-1} + \alpha_{02}z^{-2})}, \quad [7]$$

The α and β coefficients are chosen so that they may be expressed in the form $$\sum_{i=1}^{p} \pm 2^i$$

where the smallest possible value for p is chosen for each coefficient. This facilitates the design and construction of efficient multipliers to implement the coefficients.

The construction of the second filter section 146 is similar to the construction of the second filter section 144 with the exception that the elements 158, 162, and 166 are omitted from the second filter section 146, and the elements 150, 152, 154, 156, 160, and 164 of the first filter section 144 are replaced with the corresponding elements: a third adder 170, a fourth β coefficient multiplier ($\beta_{10}$) 172, a fourth adder 174, a fifth β coefficient multiplier ($\beta_{11}$) 176, a third digital delay element ($z^{-1}$) 178, and a fourth α coefficient multiplier ($-\alpha_{11}$) 180, respectively, in the second filter section 146. An input of the third adder 170 is connected to an output of the second adder 154 of the first filter section 144.

The second filter section 146 implements the following transfer function:

$$H_1(z) = \frac{(\beta_{10} + \beta_{11}z^{-1})}{(1 + \alpha_{11}z^{-1})}. \quad [8]$$

The third filter section 148 is similar to the first filter section with the exception that the adders 150 and 152, the digital delays ($z^{-1}$) 160 and 162, and the coefficient multipliers $\beta_{00}$ 152, $\beta_{01}$ 156, $\beta_{02}$ 158, $-\alpha_{01}$ 164, and $-\alpha_{02}$ 166 of the first filter section 144 are replaced with the corresponding adders 182 and 184, the digital delays ($z^{-1}$) 186 and 188, and the coefficient multipliers $\beta_{20}$ 190, $\beta_{21}$ 192, $\beta_{22}$ 194, $-\alpha_{21}$ 196, and $-\alpha_{22}$ 198, respectively.

The third filter section 148 implements the following transfer function:

$$H_2(z) = \frac{(\beta_{20} + \beta_{21}z^{-1} + \beta_{22}z^{-2})}{(1 + \alpha_{21}z^{-1} + \alpha_{22}z^{-2})}. \quad [9]$$

The overall transfer function for the IIR filter 112 is:

$$H(z) = \alpha_{00}\frac{(\beta_{00} + \beta_{01}z^{-1} + \beta_{02}z^{-2})}{(1 + \alpha_{01}z^{-1} + \alpha_{02}z^{-2})} \quad [10]$$

$$\cdot \frac{(\beta_{10} + \beta_{11}z^{-1})}{(1 + \alpha_{11}z^{-1})} \cdot \frac{(\beta_{20} + \beta_{21}z^{-1} + \beta_{22}z^{-2})}{(1 + \alpha_{21}z^{-1} + \alpha_{22}z^{-2})},$$

where the variables are as described above.

The digital coefficient multipliers for multiplying $\alpha$ and $\beta$ coefficients have similar structures. A preferred multiplier structure for implementing the multipliers is discussed more fully below. The adders 150, 154, 170, 174, 182, and 184 also have similar structures and may be implemented via conventional digital adders. Similarly, the digital delay elements ($z^{-1}$) 160, 162, 178 may be implemented via conventional digital circuits, such as latches.

In the present specific embodiment, the values of the $\alpha$ and $\beta$ coefficients of the elliptic IIR filter 112 are chosen to eliminate the possibility of overflow at each node of the IIR filter 112 and are given in the following Table:

TABLE 4

| Coefficients: | Implementation: |
|---|---|
| $\alpha_{00}$ = 22/512 | (16 + 4 + 2)/512 |
| $\alpha_{01}$ = −895/512 | −(1024 − 128 − 1)/512 |
| $\alpha_{02}$ = 414/512 | (512 − 128 + 32 − 2)/512 |
| $\alpha_{11}$ = −445/512 | −(512 − 64 − 2 − 1)/512 |
| $\alpha_{21}$ = −921/512 | −(1024 − 128 + 32 − 8 + 1)/512 |
| $\alpha_{22}$ = 476/512 | (512 − 32 − 4)/512 |
| $\beta_{00}$ = 7/64 | (8 − 1)/64 |
| $\beta_{01}$ = −3/64 | −(4 − 1)/64 |
| $\beta_{02}$ = 7/64 | (8 − 1)/64 |
| $\beta_{10}$ = 4/64 | 4/64 |
| $\beta_{11}$ = 4/64 | 4/64 |
| $\beta_{20}$ = 88/64 | (64 + 16 + 8)/64 |
| $\beta_{21}$ = −104/64 | −(64 + 32 + 8)/64 |
| $\beta_{22}$ = 88/64 | (64 + 16 + 8)/64 |

In the elliptic IIR filter 112, numerator coefficients are employed when possible to minimize the number of multipliers required.

Cascading the $2^{nd}$ order filter sections 144 and 148 and the first order filter section 146 rather than employing a single section, reduces the sensitivity of the IIR filter 112 to coefficient quantization effects.

With reference to equation (10), the poles of the IIR filter 112 are approximately: 0.899+0.3475j, 0.899−0.345j, 0.874+0.2116j, 0.874−0.2116j, and 0.8698, where the coefficients of the j terms represent the imaginary parts. Hence, the IIR filter 112 includes two poles below the real axis in the second quadrant, two poles above the real axis in the first quadrant, and one pole on the real axis between the first and second quadrants. The zeros of the IIR filter 112 are approximately: 0.581+0.8139j, 0.581−0.8139j, 0.2008+0.9796j, 0.2008−0.9796j, and −1. Hence, the IIR filter 112 includes two zeros above the real axis in the first quadrant, two zeros below the real axis in the second quadrant, and one zero on the real axis between the third and fourth quadrants.

Those skilled in the art will appreciate that another type of filter may be employed to implement the above pole-zero placement rather than a cascade direct form II IIR filter, without departing from the scope of the present invention. For example, the IIR filter 112 may be implemented in parallel form without departing from the scope of the present invention.

An alternative cascade structure for the IIR filter 112 has several possible configurations depending on pole-zero pairing and the sequencing (permutation) of the sub-filters 144, 146, and 148. At least twelve possible filter configurations having different pole-zero pairings and permutations are possible, without departing from the scope of the present invention. The configurations may be implemented as direct form II or transposed direct form $I_t$ filters, yielding 24 possible filter structures. Also, direct form I and transposed direct form I filter structures may be employed for the IIR filter 112 may be employed without departing from the scope of the present invention.

The IIR filter 112 operates on 11Q6 signals. This helps establish a minimal filter signal-to-quantization noise ratio of 26 dB. This is equivalent to the maximum output noise variance of 0.226, assuming an I, Q signal power level of 9 dB. Since the output noise variance caused by the quantization error of the filter 112 is approximately 36.46 when the variance of the Additive White Gaussian Noise (AWGN) source is $\frac{1}{12}$, the output noise variance must be reduced by a factor of 1613. This is achieved by setting the Least Significant Bit (LSB) value to $2^{-6}$, which implies that the adders should be 11Q6 adders.

With reference to FIGS. 2, 4 and 5, in the present specific embodiment, the MSM 56 of FIG. 2 takes a 4-bit resolution (4Q0) input. Consequently, the overall Signal-to-Quantization-Noise Ratio (SQNR) is approximately 20 dB if the received complex signal power is set to 18 dB by Automatic Gain Control (AGC) circuitry (not shown) in the receiver front end 52 of FIG. 2.

The IIR filter 112 helps to establish a minimal SQNR of 26 dB for the lowpass filter 80 of FIG. 4, which renders an additional loss of at most 1 dB to the overall SQNR of the receiver front end 52 and 3×MC filter 54. Those skilled in the art will appreciate that the minimal SQNR requirement of 26 dB is application-specific. In applications not employing an MSM requiring a 4-bit resolution input, the minimal SQNR requirement of 26 dB will change accordingly.

Generally, a recursive digital filter may exhibit undesirable periodic output signal oscillations, called limit cycles. Limit cycles are often caused by filter non-linearity resulting from finite-precision arithmetic operations. Finite-precision arithmetic operations, such as multiplication and addition may introduce nonlinear effects from quantization errors and over flow errors, respectively. The digital IIR filter 112 employs the $\alpha$ and $\beta$ coefficients to properly scale input signals to prevent overflow.

Limit cycles are either small scale or large scale limit cycles. Small-scale limit cycles are often caused by signal quantization and depend on the filter structure and the type of quantization (truncation or rounding) employed. Small-scale limit cycles are reduced by increasing quantization resolution.

Large-scale limit cycles are often caused by overflow resulting from digital signal addition. Generally, large-scale limit cycles are more problematic. To reduce or prevent large-scale limit cycles, the IIR filter 112 is designed to eliminate overflow possibilities via the use of saturating-type adders 150, 154, 170, 174, 182, and 184.

Coefficient quantization effects depend on filter structure and pole location. Filters with poles clustered together are typically more sensitive to coefficient quantization when implemented in direct forms. Consequently, such filters may require higher coefficient precision.

By implementing the high-order IIR filter 112 as a combination of lower order filters 144, 146, and 148, coefficient quantization effects are minimized. While the IIR filter 112 may be implemented differently via various combinations lower order filters, such as $2^{nd}$ order filters, cascade and parallel structures are often easy to implement and require minimal computation.

Scaling via the α and β coefficients is employed in the IIR filter 112 of FIG. 5 to guarantee that every node which performs addition does not exceed the maximum range. In the present specific embodiment, the scaling is performed, and the α and β coefficients are chosen in accordance with the Lp norm. The Lp norm of a transfer function $F(\omega)$ from an input of a filter to a particular node of the filter is defined as:

$$Lp = \|F\|_p = \left[\frac{1}{\varpi_s}\int_0^{\varpi_s}|F(\varpi)|^p\,d\varpi\right], \quad [11]$$

where $\omega_s$ is the sampling frequency, p is an integer, and ω is a frequency variable.

Each node i of a filter scaled in accordance with the Lp norm is associated with a transfer function $F_i(\omega)$ from a filter input to that node i, which is designed so that:

$$\|F_i\|_p = \left[\frac{1}{\varpi_s}\int_0^{\varpi_s}|F_i(\varpi)|^p\,d\varpi\right] \leq 1. \quad [12]$$

If $\|F_i\|_p > 1$, then the filter is adjusted so that the transfer function $F_i(\omega)$ is multiplied by the scale factor $s_i = 1/\|F_i\|_p$ so that equation (12) is satisfied. In the IIR filter 112, numerator coefficients are employed where possible to reduce the number of requisite scaling multipliers.

When $F(\omega)$ is continuous, the limit of $\|F\|_p$ as p approaches infinity ($\|F\|_\infty$) is given in the following equation:

$$L_\infty = \|F\|_\infty = \max_{0 \leq \omega \leq \omega_s}|F(\omega)|, \quad [13]$$

where $\|F\|_\infty$ is the L-infinity norm ($L_\infty$), and the remaining variables are as described above.

The IIR filter 112 is scaled in accordance with $L_\infty$. However, the IIR filter 112 may be scaled in accordance with the Lp norm, where p is a predetermined value other than infinity, without departing from the scope of the present invention.

The transfer function $F_i(\omega)$ of each filter section 144, 146, and 148 (equations (7), (8), and (9), respectively) is scaled via the α and β coefficients in accordance with $L_\infty$ so that:

$$L_{i\infty} = \|F_i\|_\infty \leq 1 \quad [14]$$

The noise power spectrum associated with the IIR filter 112 may be modeled by the following equation:

$$S_{nn}(\varpi) = \sum_i k_i \cdot \frac{N_0}{2}|G_i(\varpi)|^2, \quad [15]$$

where the quantization noise variance is:

$$\sigma_0^2 = \|S_{nn}\|, \quad [16]$$

where $e_i[n]$ is the quantization noise associated with each i filter section (144, 146, and 148) and is modeled as a sum of $k_i$ Additive White Gaussian Noise Sources (AWGN), where each source has a two-sided power spectral density of $N_0/2$; $k_i$ represents the number of multiplications associated with the $i^{th}$ node; and where $G_i(\omega)$ is the transfer function from the noise source $e_i[n]$ to the output y(n).

In the present embodiment, the outputs of multipliers that implement the α and β coefficients are quantized before summation. Therefore, the number of quantization noise sources is equal to the number of multiplications associated with each node.

With reference to FIGS. 2 and 5, the structure and pole-zero placement of the IIR filter 112 were chosen with reference to an error metric (L) describing signal degradation or loss associated with the receiver front end 52 and the 3×MC filter 54. In the present specific embodiment, the error metric L is derived assuming the following analog signal (s(t)) was transmitted by a base station and received by the receiver 50 of FIG. 2 with an added complex AGWN noise component N(t):

$$s(t) = \sqrt{E_c}\left(\sum_{i=1}^{N_u}\sum_n x(i_0)W_n(i_0)\cdot PN_n \cdot h(t-nTc)\cdot e^{j\phi_0}\right) + \quad [17]$$

$$\sqrt{E_c}\left(\sum_{i=1}^{N_u}\sum_n x(i_{-1})W_n(i_{-1})\cdot PN_n \cdot h(t-nTc)\cdot e^{j\phi_{-1}}\right)e^{-j\omega_0 t} +$$

$$\sqrt{E_c}\left(\sum_{i=1}^{N_u}\sum_n x(i_1)W_n(i_1)\cdot PN_n \cdot h(t-nTc)\cdot e^{j\phi_1}\right)e^{j\omega_0 t} + N(t),$$

where $x(i_{-1})$, $x(i_0)$, and $x(i_1)$ represent Quadrature Phase Shift Keying (QPSK) data streams associated with the $i^{th}$ user's left, center, and right carriers respectively; $W_n(i_{-1})$, $W_n(i_0)$, and $W_n(i_1)$ represent Walsh chips associated with the $i^{th}$ user's left, center, and right carriers respectively, at time n; $\phi_{-1}$, $\phi_0$, and $\phi_1$, are phases associated with the left, center, and right carriers, respectively; $\omega_0$ represents carrier signal frequency spacing; $PN_n$ is the Psueudo Noise (PN) sequence at time n and is normalized such that $PN_n$ $$PN_n = \pm\frac{1}{\sqrt{2}} \pm \frac{1}{\sqrt{2}}j;$$

$N_u$ is the number of users, which corresponds to the number of 3×MC forward link channels communicating with the base station; $T_c$ is the chip period or sampling interval; $E_c$ is the energy per chip of each user; the function h(t) is an impulse response function representing the combined effects of the base station's pulse-shaping filter and pre-equalization filter and is the convolution of the impulse response of the pulse-shaping filter and the impulse response of the pre-equalization filter and is normalized so that $$\int_{-\infty}^{\infty}|H(f)|^2 df = 1,$$

where H(f) is the frequency response or transfer function associated with h(t); and where h(t−nTc) is h(t) shifted right by nTc.

After sampling and downconversion, the received signal s(t) is a digital signal s(n)=I(n)+jQ(n), which is input to the 3×MC filter 54. s(n) may be written as:

$$s(n) = I(n) + jQ(n) = B_0(n) + B_1(n)e^{j\omega_0 nTc} + B_{-1}(n)e^{-j\omega_0 ntc} + N(nT_c), \quad [18]$$

where n is an integer and is a digital time variable; $T_s$ is the sampling period, i.e., chip period; $B_0(n)$, $B_{-1}(n)$, and $B_1(n)$ are complex baseband representations of the center, left, and right carrier CDMA signals, respectively; and $N(nT_s)$ represents an added AWGN noise component.

The error metric L is described by the following equation:

$$L = 10 \log\left(\frac{SNR}{SNR_{ideal}}\right) = \quad [19]$$

$$10 \log\left(\frac{p[0]}{\frac{I_{or}}{N_0} \cdot \beta + 2\frac{I_{or}}{N_0} \cdot \left(\sum_n |p_1[m-n]|^2\right) + \sum_n g[n]^2}\right),$$

where $N_0$ is a noise term representative of twice the spectral density of a noise signal N(t) added to the transmitted signal by the channel between the base station and the receiver 50; SNR represents the signal-to-noise ratio of the received signal; $SNR_{ideal}$ is the ideal signal-to-noise ratio and is equal to $2NE_c/N_0$, where N is the number of chips in each symbol period, and $E_c$ is the energy per chip; $I_{or}$ represents received signal energy and is equal to $E_c N_u$, where $N_u$ is the number of users of the forward link channel from the base station to the receiver 50; g[n] is the impulse response function of the 3×MC filter 54; n is an integer corresponding to the time at which the received signal was multiplied by $PN_n$ by the base station forward link modulator; m is an integer corresponding to the time at which the received signal was multiplied by the conjugate PN sequence $PN_m^*$ by the forward link demodulator (not shown) in the MSM 56; p[n] is the convolution of the base station pulse shaping and pre-equalization filter and the impulse response of the 3×MC filter 54 (p[n]=h[n]*g[n], where * represents convolution); and β is equal to $$\sum_{n \neq m} p[m-n]^2.$$

The error metric L of equation (19) is derived by employing equations (17) and (18) and making the following assumptions:

1. One symbol is transmitted and demodulated on each carrier such that 3 QPSK symbols are transmitted by the base station, and only the center carrier is demodulated ($y_m(k_0)$ and $Z_0$ are dealt with).
2. The channel over which the 3×MC signal is transmitted is an AWGN channel with no multi-path fading.
3. Coherent demodulation is employed; each forward link channel carrier signal phase is known.
4. Each QPSK symbol on each carrier both from different users and from the same user is independent and identically distributed with zero mean.
5. No interference exists between I and Q signal components and therefore it is sufficient to consider only the real parts of $y_m(k_0)$ and $Z_0$ when calculating the error metric L.

Those skilled in the art will appreciate that a different error metric derived in accordance may be employed to select the structure of the IIR filter 112 to meet the needs of a given application without departing from the scope of the present invention.

The parameter L represents the degradation in SNR caused by an imperfect filter and depends on the filter impulse response g[n] and the $I_{or}/N_o$ ratio. By plotting L versus $I_{or}/N_o$ for various IIR filters and structures, such as Chebyshev II, Chebyshev I, Butterworth, elliptic, and matched filters the type of filter most suitable (in terms of performance, cost, size, and so on) for a given application may be selected. In the present specific embodiment, the $5^{th}$ order elliptic IIR filter 112 was selected based on its performance according to the parameter L of equation (19) relative to other tested filters. The selection of the IIR filter 112 is based the unique error metric L, which accounts for inter-carrier interference, inter chip interference, and AWGN.

By selecting the structure of the filter 50 and the corresponding coefficients in accordance with the error metric L of equation (19), the IIR filter 50 is ensured to match base station pulse shaping, compensate for 1× bandwidth base station pre-equalization to minimize overall phase non-linearity, and facilitate small inter-carrier interference.

A method for designing filters in accordance with the present invention involves determining an error metric L to judge filter performance; selecting the filter type based on this criterion; determining the structure of the filter, such as cascade direct form, based on the selected filter type; then strategically selecting coefficients to facilitate implementation in accordance with the selected structure.

Figure 6:
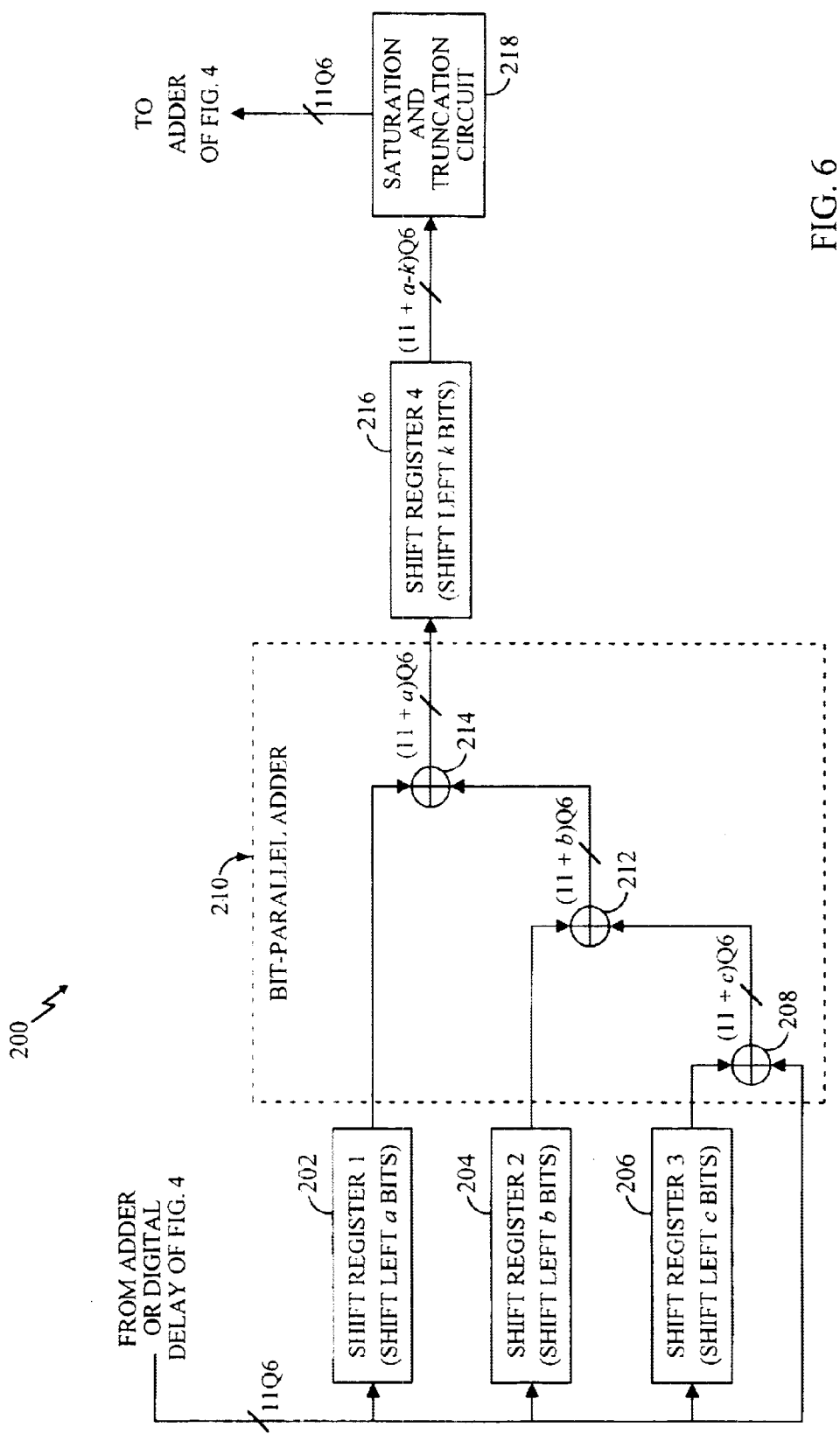
FIG. 6 is a diagram of a multiplier for implementing the coefficient multipliers of FIG. 5.

FIG. 6 is a diagram of a digital multiplier 200 for implementing the coefficient multipliers of FIG. 5. A coefficient multiplier 200 includes a first shift register 202, a second shift register 204, and a third shift register 206. Inputs of the registers 202, 204, and 206 are connected to an output of an adder or digital delay of FIG. 5, which is also connected to a first input of a (11+c)Q6 adder 208 of a bit-parallel adder 210. An output of the third shift register 206 is connected to a second input of the (11+c)Q6 adder 208, an output of which is connected to a first input of an (11+b)Q6 adder 212 of the bit-parallel adder 210. A second input of the (11+b)Q6 adder 212 is connected to an output of the second shift register 204. An output of the (11+b)Q6 adder 212 is connected to a first input of an (11+a)Q6 adder 214 of the bit-parallel adder 210. A second input of the (11+a)Q6 adder 214 is connected to an output of the first register 202. An output of the (11+a)Q6 adder 214 is input to a fourth register 216. An output of the fourth register 216 is input to a saturation and truncation circuit 218. An output of the saturation and truncation circuit 218 is an 11Q6 signal, which represents the output of the coefficient multiplier 200.

In operation, the digital multiplier multiplies an 11Q6 input by the factor $(2^a+2^b+2^c+1)/2^k$, where k, a, b, and c are integers and where a>b>c, by shifting and adding. For example, with reference to Table 4, the multiplier $\alpha_{00}$ is implemented with the structure of the multiplier 200 where k=9, a=4, b=2, and c=0, which yields the following factor: (16+4+2)/512=22/512.

The first shift register 202 shifts the 11Q6 input signal left by a bits. The second shift register 204 shifts the 11Q6 input signal left by b bits. The third shift register 206 shifts the 11Q6 input signal left by c bits, and the result is added to the non-shifted 11Q6 input signal. The resulting signal is (11+c)Q6 bits wide and is added to the shifted output of the second register 204 by the (11+b)Q6 adder 212, which yields an (11+b)Q6 result. The an (11+b)Q6 result is added to the shifted output of the first register 202 by the (11+a)Q6 adder 214, which yields and (11+a)Q6 result. The (11+a)Q6 result represents the factor $2^a+2^b+2^c+1$, which is shifted right by k bits, which corresponds to dividing by $2^k$, by the fourth shift register 216. The fourth register 216 outputs an (11+a+k)Q6 signal to the saturation and truncation circuit 218 which converts the (11+a+k)Q6 signal to an 11Q6 signal, which represents the output of the digital multiplier 200.

Since the α and β coefficients are combinations of powers of 2, the associated multiplication of digital input signals by the α and β coefficients is implemented by shifting and adding. The multiplier 200 of FIG. 6 is an exemplary multiplier. The shifters 202, 204, and 206 are implemented by hard-wires (fixed shift). The addition via the adders 208, 212, 214, and 216 is performed in a bit-parallel manner. This reduces the total delay through the multiplier 200 to n+m, where n is the number of bits being added and m is the number of the powers of 2 that add up to the particular α or β coefficient implemented by the multiplier 200.

The multiplier 200 compensates for the fact that the bitwidth of the product output by the fourth shift register 216 increases a–k bits relative to the 11Q6 input of the multiplier 200, where a is the number of bits shifted by the first shift register 202 and k is the number of bits shifted by the fourth shift register 216 such that the α or β coefficient implemented by the multiplier 200 is equal to $(2^a+2^b+2^c+1)/2^k$ as described above. (k is equal to 9 in the present specific embodiment.) The bitwidth expansion compensation is performed by saturating and truncating the output of the fourth shift register 216 via the saturation and truncation circuit 218, which outputs an 11Q6 result.

The following table describes microprocessors/DSP components employed in the present specific embodiment of the 3×MC filter 54 of FIG. 2:

TABLE 5

| Block: | Component Type: | Read/Write: | Quantity: | Bit Width: | Purpose: |
|---|---|---|---|---|---|
| Phase Accumulator 70 | Micro Register | Read/Write | 1 | 18 | Program the frequency offset |
| IIR Filter (76, 80, 82) | Micro Register 116 | Read/Write | 1 | 11 | Program the DC offset |

The following table describes general purpose registers employed in the present specific embodiment of the 3×MC filter 54 of FIG. 2:

TABLE 6

| Block: | Component Type: | Quantity: | Bit Width: | Purpose: |
|---|---|---|---|---|
| Phase Accumulator 70 | Latch | 1 | 20 | Storing Phase |
| IIR Filter (76, 80, 82) | Latch ($z^{-1}$) | 5 (per IIR filter) | 11 | Delay Elements |

The following table describes adders employed in the present specific embodiment of the 3×MC filter 54 of FIG. 2.

TABLE 7

| Block: | Component Type: | Quantity: | Bit Width: |
|---|---|---|---|
| Phase Accumulator 70 | Adder | 1 | 20 |
| IIR Filter (76, 80, 82) (per IIR filter) | Adder | 7 | 11 |
|  |  | 4 | 6 |
| Rotator 72 | Adder | 2 | 5 |
|  |  | 4 | 6 |

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

Accordingly,

What is claimed is:

1. A filter for a wireless communications system employing a multi-carrier signal comprising:

first means for extracting carrier signal components from the multi-carrier signal; and second means for filtering the carrier signal components to generate a demodulated and filtered multi-bandwidth signal, wherein the second means includes an Infinite Impulse Response (IIR) filter for matching a pulse shape of the multi-carrier signal, and wherein the second means further includes means for compensating for pre-equalization effects on the multi-carrier signal to minimize phase non-linearity, and wherein the IIR filter is a $5^{th}$ order elliptic IIR filter employed as a 1× lowpass filter for lowpass filtering the carrier signal components, where the carrier signal components define three data streams separated in frequency, and wherein the IIR filter has a cascade direct form II structure and wherein the IIR filter is characterized by the following transfer function:

$$H(z) = \alpha_{00} \frac{(\beta_{00} + \beta_{01} z^{-1} + \beta_{02} z^{-2})}{(1 + \alpha_{01} z^{-1} + \alpha_{02} z^{-2})} \cdot \frac{(\beta_{10} + \beta_{11} z^{-1})}{(1 + \alpha_{11} z^{-1})} \cdot \frac{(\beta_{20} + \beta_{21} z^{-1} + \beta_{22} z^{-2})}{(1 + \alpha_{21} z^{-1} + \alpha_{22} z^{-2})}$$

where $\alpha_{00}$, $\alpha_{01}$, $\alpha_{02}$, $\alpha_{11}$, $\alpha_{21}$, $\alpha_{22}$, $\beta_{00}$, $\beta_{01}$, $\beta_{02}$, $\beta_{10}$, $\beta_{11}$, $\beta_{20}$, $\beta_{21}$, and $\beta_{22}$ are predetermined constants, and z is a complex variable.

2. The filter of claim 1 wherein $\alpha_{00} \approx 22/512$, $\alpha_{01} \approx -895/512$, $\alpha_{02} \approx 414/512$, $\alpha_{11} \approx -445/512$, $\alpha_{21} \approx -921/512$, $\alpha_{22} \approx 476/512$, $\beta_{00} \approx 7/64$, $\beta_{01} \approx -3/64$, $\beta_{02} \approx 7/64$, $\beta_{10} \approx 4/64$, $\beta_{11} \approx 4/64$, $\beta_{20} \approx 88/64$, $\beta_{21} \approx -104/64$, and $\beta_{22} \approx 88/64$.

3. A filter for a wireless communications system employing a multi-carrier signal comprising:

first means for extracting carrier signal components from the multi-carrier signal; and second means for filtering the carrier signal components to generate a demodulated and filtered multi-bandwidth signal, wherein the second means includes an Infinite Impulse Response (IIR) filter for matching a pulse shape of the multi-carrier signal, and wherein the second means further includes means for compensating for pre-equalization effects on the multi-carrier signal to minimize phase non-linearity, and wherein the IIR filter is a $5^{th}$ order elliptic IIR filter employed as a 1× lowpass filter for lowpass filtering the carrier signal components, where the carrier signal components define three data streams separated in frequency, and wherein the IIR filter has a cascade direct form II structure, and further including means for avoiding overflow at nodes of the IIR filter.

4. The filter of claim 3 wherein the means for avoiding overflow includes means for scaling signal values at the nodes in accordance with the L-infinity norm.

5. The filter of claim 4 wherein the means for scaling includes a multiplier that multiplies by shifting and adding.

6. The filter of claim 5 wherein registers of the filter have a bit-width of 11Q6.

7. The filter of claim 6 wherein adders of the IIR filter are saturating-type adders.

8. A receiver for a wireless communications system comprising:
   a receive section having a Radio Frequency (RF) to Intermediate Frequency (IF) circuit and an IF to baseband circuit;
   a multi-carrier filter in communication with the receive section, the multi-carrier filter having:
      a first lowpass filter for filtering a first data stream,
      a phase accumulator coupled to a rotator,
      a second lowpass filter for filtering a second data stream output by the rotator, and
      a third lowpass filter for filtering a third data stream output by said rotator; and
      a Mobile Station Modem (MSM) coupled to the first lowpass filter, the second lowpass filter, and the third lowpass filter.

9. The receiver of claim 8 wherein the rotator includes means for rotating an input complex signal clockwise and counter clockwise to generate the second and third data streams, respectively.

10. The receiver of claim 8 wherein the receive section includes Mobile Analog Receive Section (MARS) receiver front-end circuitry including pre-equalization compensation circuitry.

11. The receiver of claim 10 further including means for selectively bypassing the MARS pre-equalization compensation circuitry in accordance with a mode of the receive section.

12. The receiver of claim 11 wherein the first, second, and third lowpass filters each include an elliptic Infinite Impulse Response (IIR) filter for facilitating lowpass filtering of said first, second, and third data streams, respectively.

13. The receiver of claim 12 wherein the elliptic IIR filter includes a first section, a second section, and a third section.

14. The receiver of claim 13 wherein the first section includes a first adder, an output of the first adder connected to a first digital delay and to a first scaling circuit ($\beta_{00}$), an output of $\beta_{00}$ connected to a first input of a second adder, an output of the first digital delay connected to an input of a second digital delay, an input of a second scaling circuit ($-\alpha_{01}$), and to an input of a third scaling circuit ($\beta_{01}$), a first output of the second digital delay connected to an input of a fourth scaling circuit ($-\alpha_{02}$) and a fifth scaling circuit ($\beta_{02}$), outputs of the second and fourth scaling circuits ($-\alpha_{01}$ and $-\alpha_{02}$) connected to inputs of the first adder, outputs of the third and fifth scaling circuits ($\beta_{01}$ and $\beta_{02}$) connected to inputs of the second adder, and an output of the second adder representing an output of the first section, an input of the first adder representing an input of the first section.

15. The receiver of claim 14 wherein the second section is positioned between the first section and the third section, the second section being similar to the first section with the exception that the second digital delay and the fourth and fifth scaling circuits are omitted,
   wherein one or more values associated with the first, second, and third scaling circuits of the third section are different than corresponding values associated with the first, second, third scaling circuits of the first section.

16. The receiver of claim 15 wherein the third section is similar to the first section with the exception that one or more values associated with the first, second, third, fourth, and fifth scaling circuits of the third section differ from values associated with the first, second, third, fourth, and fifth scaling circuits of the first section.

17. A multi-carrier filter comprising:
   first means for separating data streams from a multi-carrier signal; and
   second means for filtering the separated data streams to generate filtered output signals in response thereto, wherein the separated data streams include a center data stream, a left data stream, and a right data stream, and wherein the second means includes a 3× multi-carrier filter for filtering the center data stream, the left data stream, and the right data stream to maximize signal-to-noise ratio.

18. The multi-carrier filter of claim 17 wherein the 3× multi-carrier filter includes a first lowpass filter for filtering the center data stream, a second lowpass filter for filtering the right data stream, and a third lowpass filter for filtering the left data stream, the first, second, and third lowpass filters each including means for compensating for 1× bandwidth pre-equalization and means for accommodating pulse-shaping associated with a received multi-carrier signal.

19. The multi-carrier filter of claim 18 wherein the means for accommodating and the means for compensating include an elliptic lowpass Infinite Impulse Response (IIR) filter.

20. The multi-carrier filter of claim 19 wherein the lowpass IIR filter is a $5^{th}$ order elliptic IIR filter having cascaded lower order sub-filters.

21. The multi-carrier filter of claim 20 wherein a transfer function of the lowpass IIR filter is selected to accommodate a predetermined error metric that accounts for inter-carrier interference, inter chip interference, and noise.

* * * * *